(12) United States Patent
Oyadomari et al.

(10) Patent No.: US 7,827,248 B2
(45) Date of Patent: Nov. 2, 2010

(54) DISCOVERY AND SELF-ORGANIZATION OF TOPOLOGY IN MULTI-CHASSIS SYSTEMS

(76) Inventors: Randy Oyadomari, 3026 Rose Creek Dr., San Jose, CA (US) 95148; George Bullis, 147 Branch Oak Ct., Glendora, CA (US) 91741; Ken Hornyak, 5236 Hecker Ct., San Jose, CA (US) 95135; Scott Baxter, 806 Coleman Ave. #22, Menlo Park, CA (US) 94025; Stephen Strong, 273 Pegosa Way, Fremont, CA (US) 94539; Doug Durham, 1788 Lark La., Sunnyvale, CA (US) 94087

( * ) Notice: Subject to any disclaimer, the term of this patent is extended or adjusted under 35 U.S.C. 154(b) by 1820 days.

(21) Appl. No.: 10/868,631

(22) Filed: Jun. 14, 2004
(Under 37 CFR 1.47)

(65) Prior Publication Data
US 2005/0060413 A1 Mar. 17, 2005

Related U.S. Application Data

(60) Provisional application No. 60/478,396, filed on Jun. 13, 2003, provisional application No. 60/479,735, filed on Jun. 19, 2003.

(51) Int. Cl.
*G06F 13/00* (2006.01)
(52) U.S. Cl. .................. 709/208; 709/214; 709/224; 715/736
(58) Field of Classification Search ................ 709/224, 709/223, 214, 208, 209; 715/734–736
See application file for complete search history.

(56) References Cited

U.S. PATENT DOCUMENTS 4,434,466 A 2/1984 Friedli
(Continued)

FOREIGN PATENT DOCUMENTS

EP 0726664 A2 8/1996
(Continued)

OTHER PUBLICATIONS

Web page: Marvell Press Release, *Galileo Announces New High-Performance 240-Port Ethernet Switch Reference Design*, 1999.
(Continued)

*Primary Examiner*—Kenneth R Coulter (57) ABSTRACT

Multi-chassis systems determine their topology and self-organize through a discovery process. The systems include one or more chassis, each with individual blades and ports, which are serially chained together. When the discovery process is initiated, chassis identification data in buffers in each chassis is propagated to adjacent chassis and is then used to initiate communication via a network connection. Once the chassis are able to communicate via the network connection, at least one chassis in the system receives the chassis identification data of each chassis and can thereby identify each chassis. The chain is then divided into one or more sync-groups and master and slave chassis are designated. Each sync-group is configured to ignore data from other sync-groups. Domains are also configured from sets of ports within each sync-group. Events that may trigger the discovery process include power-up, the connection of a cable, the removal of a cable, or instructions to transition from normal mode to discovery mode.

28 Claims, 5 Drawing Sheets

U.S. PATENT DOCUMENTS

| | | | |
|---|---|---|---|
| 4,484,264 A | 11/1984 | Friedli | |
| 4,792,753 A | 12/1988 | Iwai | |
| 5,027,297 A | 6/1991 | Garitty et al. | |
| 5,517,662 A | 5/1996 | Coleman | |
| 5,535,193 A | 7/1996 | Zhang | |
| 5,557,744 A | 9/1996 | Kobayakawa | |
| 5,590,116 A | 12/1996 | Zhang | |
| 5,696,701 A | 12/1997 | Burgess et al. | |
| 5,761,424 A | 6/1998 | Adams et al. | |
| 5,812,529 A | 9/1998 | Czarnik et al. | |
| 5,850,386 A | 12/1998 | Anderson et al. | |
| 5,912,701 A | 6/1999 | Morton, Jr. | |
| 6,049,545 A | 4/2000 | Stephenson et al. | |
| 6,058,116 A | 5/2000 | Hiscock et al. | |
| 6,098,157 A | 8/2000 | Hsu et al. | |
| 6,243,834 B1 | 6/2001 | Garrett | |
| 6,266,789 B1 | 7/2001 | Bucher et al. | |
| 6,335,931 B1 | 1/2002 | Strong et al. | |
| 6,507,923 B1 | 1/2003 | Wall et al. | |
| 6,597,691 B1 * | 7/2003 | Anderson et al. | 370/360 |
| 6,633,835 B1 | 10/2003 | Moran | |
| 6,636,518 B1 | 10/2003 | Liencres | |
| 6,639,957 B2 | 10/2003 | Cahil-O'Brien et al. | |
| 6,654,356 B1 | 11/2003 | Eidson et al. | |
| 6,665,725 B1 | 12/2003 | Dietz et al. | |
| 6,735,629 B1 | 5/2004 | Cafarelli | |
| 6,789,182 B1 | 9/2004 | Brothers et al. | |
| 6,793,539 B1 | 9/2004 | Lee et al. | |
| 6,925,052 B1 | 8/2005 | Reynolds | |
| 6,941,482 B2 | 9/2005 | Strong | |
| 7,010,607 B1 | 3/2006 | Bunton | |
| 7,092,407 B2 | 8/2006 | Ruhnow | |
| 7,120,121 B2 | 10/2006 | Sikdar | |
| 7,120,680 B1 * | 10/2006 | Higgins et al. | 709/220 |
| 7,228,348 B1 | 6/2007 | Farley | |
| 2003/0177497 A1 | 9/2003 | Macrae | |
| 2003/0195958 A1 | 10/2003 | Byron | |
| 2003/0225482 A1 | 12/2003 | Topka | |
| 2004/0028038 A1 * | 2/2004 | Anderson et al. | 370/386 |
| 2004/0148376 A1 * | 7/2004 | Rangan et al. | 709/223 |
| 2004/0190502 A1 * | 9/2004 | Sharma | 370/360 |
| 2005/0010691 A1 * | 1/2005 | Oyadomari et al. | 709/248 |
| 2005/0060402 A1 * | 3/2005 | Oyadomari et al. | 709/224 |
| 2005/0278760 A1 * | 12/2005 | Dewar et al. | 725/94 |
| 2008/0034120 A1 * | 2/2008 | Oyadomari et al. | 709/248 |

FOREIGN PATENT DOCUMENTS

| | | | |
|---|---|---|---|
| WO | WO 01/052400 A1 | 7/2002 | |

OTHER PUBLICATIONS

Web page: Internetweek.com, Schultz, Keith, *A Complete Solution, Enterasys Networks Proves its Mettle in Enterprise-Class Switching*, Jan. 22, 2001.

U.S. Appl. No. 10/881,620, filed Jun. 30, 2004, Oyadomari et al.
U.S. Appl. No. 10/882,711, filed Jun. 30, 2004, Oyadomari et al.
U.S. Appl. No. 10/238,358, filed Apr. 26, 2005, Notice of Allowance.
U.S. Appl. No. 10/881,620, filed Jul. 23, 2008, Office Action.
U.S. Appl. No. 10/882,711, filed Apr. 28, 2008, Office Action.

* cited by examiner

DISCOVERY AND SELF-ORGANIZATION OF TOPOLOGY IN MULTI-CHASSIS SYSTEMS

CROSS-REFERENCE TO RELATED APPLICATIONS

This application claims the benefit of: U.S. Provisional Application No. 60/478,396, filed Jun. 13, 2003, and U.S. Provisional Application No. 60/479,735, filed Jun. 19, 2003, both of which are hereby incorporated herein by reference in their entirety.

BACKGROUND OF THE INVENTION

1. The Field of the Invention

The present invention relates generally to multi-channel high speed communications systems, methods, and devices useful in analyzing network traffic. More particularly, embodiments of the invention relate to systems and methods for coordinating the operation of various chassis, blades, ports, and analyzers in a multi-chassis network analyzer system.

2. The Relevant Technology

Computer and data communications networks continue to develop and expand due to declining costs, improved performance of computer and networking equipment, and increasing demand for communication bandwidth. Communications networks, including for example, wide area networks ("WANs"), local area networks ("LANs"), and storage area networks ("SANs") allow increased productivity and utilization of distributed computers or stations through the sharing of resources, the transfer of voice and data, and the processing of voice, data, and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Gigabit Ethernet, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types have different sets of standards, referred to as protocols, which set forth the rules for accessing the network and for communicating among the resources on the network.

Typically, transmissions between network connected devices are passed through a hierarchy of protocol layers at each of the connected devices. For example, each layer in a first network connected device essentially carries on a conversation with a corresponding layer in a second network connected device in accordance with an established protocol that defines the rules of communication between the layers.

As communication networks have increased in number, size and complexity however, they have become more likely to develop a variety of problems that are increasingly difficult to diagnose and resolve. Moreover, the demands for network operational reliability and increased network capacity, for example, emphasize the need for adequate diagnostic and remedial systems, methods and devices.

Exemplary causes of network performance problems include the transmission of unnecessarily small frames of information, inefficient or incorrect routing of information, and improper network configuration and superfluous network traffic, to name just a few. Such problems are aggravated by the fact that many networks are continually changing and evolving due to growth, reconfiguration and introduction of new network typologies and protocols, as well as the use of new interconnection devices and software applications.

Consequently, as high speed data communications mature, many designs increasingly focus on reliability and performance issues. In particular, communications systems have been designed to respond to a variety of network errors and problems, thereby minimizing the occurrence of network failures and downtimes. In addition, equipment, systems and methods have been developed that allow for the testing and monitoring of the ability of a communications system to respond to and deal with specific types of error conditions on a network. In general, such equipment, systems, and methods provide the ability to selectively alter channel data, including the introduction of errors into channel data paths.

Generally, one device that is used to detect these errors is a network analyzer, also called a protocol analyzer. A protocol analyzer runs in the background of a network, capturing, examining and logging packet traffic. Protocol analyzers can, for example, be configured to watch for unusual IP addresses, time stamps and data packets, and most have a user interface for enabling the network administrator to have access to information representing the analysis performed by the protocol analyzers. Protocol analyzers are thus a fundamental and highly useful tool for testing and debugging various types of communications networks, including computing and computer storage networks. A protocol analyzer operates by capturing selected portions of data from a data stream that is transmitted via the communications network. The captured information may then be analyzed by the protocol analyzer to extract desired information. For instance, data transmission faults or errors, or performance errors, known generally as problem conditions, may be diagnosed by examining the captured data that is related to the problem. Hacking can also be detected through a protocol analyzer.

Protocol analyzers have ports that provide connectivity to a network and permit the protocol analyzers to receive and capture network data. A typical conventional protocol analyzer includes a set of ports, usually two per channel or data link that is being analyzed. The ports are exposed through a chassis and are ordinarily positioned on a blade, or card, that has hardware and software for capturing network data and performing the analysis. As networks have become more complex and sophisticated, protocol analyzers with increasing numbers of ports have been developed, enabling the protocol analyzers to be configured for use with different data links or channels. Increasing numbers of ports also increases the complexity of the protocol analyzers and presents the problem of coordinating among ports to capture network data in a way that enables the time sequence of the data transmitted in multiple channels or data links to be accurately represented. Moreover, there are practical commercial and technical considerations that limit the number of ports that are desirable for inclusion in a single protocol analyzer chassis.

BRIEF SUMMARY OF THE INVENTION

In general, embodiments of the invention relate to a system including multiple protocol analyzer chassis, each with individual blades and ports, that are serially chained together. The set of multiple protocol chassis enables individual protocol analyzers to be modular and used together as required by the network administrator. Each chassis supports a particular number of blades, with each blade supporting a particular number of ports. These chassis thus provide access to a large number of ports that can be used for various purposes. The ports in the set of protocol analyzer chassis can be configured and associated with each other into logical groupings or domains. The ports within a domain can be used together to capture and analyze data transmitted on multiple channels or data links in a network.

In particular, this invention relates to the "Discovery Mode" of the system by which a set of interconnected protocol analyzer chassis discovers its topology so that "sync-groups," or defined sets of interconnected chassis, can be created, configured, and used together to capture network data and trigger on data of interest. This process of discovering the system's topology and configuring the operation of the set of protocol analyzers accordingly enables protocol analyzer chassis to be easily added to or removed from the system without requiring the network administrator to manually identify the topology and configure the chassis accordingly.

According to one aspect of the invention, each chassis includes chassis identification buffers that are in communication with cable receptacles on the chassis. For example, each chassis may have four chassis identification buffers: one for incoming data from an upstream chassis, one for outgoing data to the upstream chassis, one for incoming data from a downstream chassis and one for outgoing data to the downstream chassis. In order to facilitate the discovery of the topology and the establishment of sync-groups and a master chassis in the chain, software resident on the protocol analyzers writes information in the aforementioned buffers. For instance, the IP address of each chassis can be written in the two outgoing buffers of each chassis. When an event, such as power-up, the connection of a cable, the removal of a cable, or the transition from normal, or trigger, mode to discovery mode, the chassis or other devices initiate the discovery process, which involves sending the information in the outgoing buffers to the incoming buffers of the adjacent upstream or downstream chassis. This information is then propagated to the other chassis in the chain such that at least one chassis can identify the IP address and relative position of each of the chassis in the chain. Once this has occurred, each chassis may communicate with the other chassis via their management port, which connects each chassis to a network such as an Ethernet local-area network (LAN). The management port is also the method by which the client software, which is run on a system also on the network, communicates with the chassis to control the protocol analyzers or other hardware that resides in the chassis.

The chain can be divided into one or more sync-groups, each sync-group having a master chassis and zero or more slave chassis. Each chassis is configured to ignore data from chassis that are not included in its sync-group. The ports of each sync-group are configured into domains that operate within the sync-group to capture data of interest. Generally, once the topology is discovered, the most upstream chassis in a sync-group is declared to be the master, with the other(s) being slaves. The master supplies a clock to all the slave chassis, and coordinates the start operation within the sync-group. Stopping and triggering within the sync group may originate from any chassis.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

In general, embodiments of the invention are concerned with a system in which multiple protocol analyzer chassis, or boxes, each with individual blades and ports, are serially chained together and configured into sync-groups to allow data to be captured from multiple ports in a domain that can be spread across the serially connected chassis. In particular, this invention relates to the "Discovery Mode" of the system by which a set of interconnected chassis discovers its topology so that "sync-groups," or defined sets of interconnected chassis, can be created, configured, and used together to capture network data and trigger on data of interest.

Related embodiments in which the configured sync-groups are operated in a "Normal Mode" to effectively capture network data of interest are described in U.S. Provisional Patent Application No. 60/484,208, entitled "Propagation of Signals Between Devices for Triggering Capture of Network Data, filed Jun. 30, 2003, and U.S. Provisional Patent Application No. 60/483,993, entitled "Synchronization of Timestamps to Compensate for Communication Latency Between Devices, filed Jun. 30, 2003, both of which are incorporated herein by reference. According to these embodiments, each of the blades in the sync-groups can be started, stopped, and triggered at the same time, or approximately the same time, to capture network data of interest, rather than at a delay caused by the hardware delays inherent in serially connected network devices. The foregoing patent applications include details of starting, stopping, triggering, capture, and analysis of network traffic using a sync-group of protocol analyzer chassis, whose topology has been discovered and configured according to the methods and systems disclosed herein. The foregoing patent applications also disclose in detail the synchronization methods that can be used to account for the timing of network data that is simultaneously captured using ports located in different protocol analyzer chassis.

Generally, embodiments of the present invention connect each chassis in a serial chain to as many as two other chassis, one in the upstream direction and one in the downstream direction. Within a single chassis, dedicated signals from every port can be used to transmit data between a blade and a motherboard or between blades. Between multiple chassis, however, there are a limited number of cables to connect every chassis together. In general, there are fewer cables between any two chassis than the number of domains, or logical groupings, of ports. Rather than using a dedicated cable between adjacent chassis for each port, the cables implement a protocol, defined herein below, that permits serial communication for multiple domains to be achieved on a single or relatively small number of cables. In addition, because the length of the chain is not predetermined, it is impossible to predict how long the chain might be and provide a signal for each port.

Accordingly, exemplary chassis according to the invention may further include chassis identification buffers. For example, the protocol analyzers can include four chassis identification buffers: one for incoming data from an upstream chassis, one for outgoing data to the upstream chassis, one for incoming data from a downstream chassis and one for outgoing data to the downstream chassis. In order to facilitate the discovery of the topology and the establishment of sync-groups and a master chassis in the chain, provided software writes information in the aforementioned buffers. For instance, the IP address of each chassis can be written in the two outgoing buffers of each chassis. When an event, such as power-up, the connection of a cable, the removal of a cable, or the transition from normal, or trigger, mode to discovery mode, the chassis or other devices initiate the discovery process, which involves sending the information in the outgoing buffers to the incoming buffers of the adjacent upstream or downstream chassis. This information can then be propagated to the other chassis in the chain such that at least one chassis can identify the IP address and relative position of each of the chassis in the chain.

The chain can be divided into one or more sync-groups, each sync-group having a master chassis, zero or more slave chassis, and two end points. Each chassis is configured to ignore data from chassis that are not included in its sync-group. The ports of each sync-group are configured into domains that operate within the sync-group to capture data of interest. Generally, once the topology is discovered, the most upstream chassis in a sync-group is declared to be the master, with the other(s) being slaves. The master coordinates the start, stop, and triggering within the sync-group.

As a practical matter, the present invention is often tied to a particular hardware implementation. The particular hardware configuration discussed herein, however, is for illustrative purposes and the present invention is not necessarily limited to any specific hardware configuration. Various embodiments of the present invention may comprise a special purpose or general-purpose computer including various computer hardware, as discussed in greater detail below.

As used herein, the terms "protocol analyzer" and "network analyzer" are interchangeable and relate to devices having hardware or software for performing network troubleshooting, monitoring, network data analysis, network performance analysis, diagnosis, traffic simulation, bit error rate testing, network jamming, or other procedures that are conventionally performed by protocol analyzers or network analyzers. Protocol analyzers and network analyzers represent examples of special-purpose computers that can perform the operations associated with the methods described herein.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in particular detail in order to avoid unnecessarily obscuring the present invention.

Figure 1:
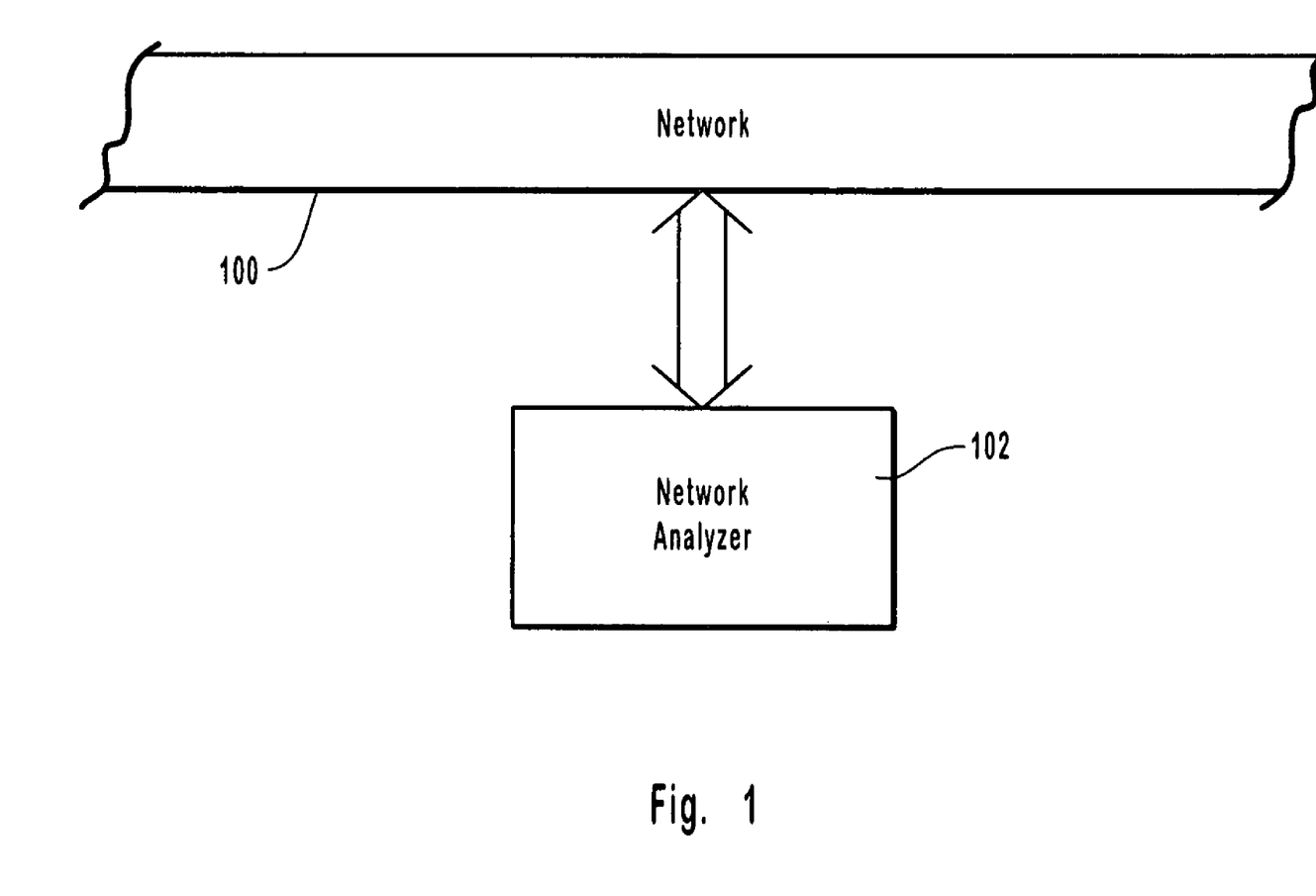
FIG. 1 is a schematic diagram that illustrates the relation of a protocol analyzer with respect to a computer network according to embodiments of the invention.

Reference is first made to FIG. 1, which shows a simplified view of a portion of a communications network, generally designated at 100. The communications network 100 may comprise, for illustrative purposes, a portion of a wide area network (WAN), a local area network (LAN), a storage area network (SAN), or other networks known in the art. The communications network 100 includes various components that communicate with one another via the network, including for example, computers, servers, and mass storage devices. Transmitted data exchanged between these components and others known in the art is referred to herein as communications or network traffic. The communications traffic is transmitted via network components by processes well known in the art. The data contained in the communications traffic can comprise both physical protocols, which characterize the nature or formatting of the data, and logical protocols that include the content of the data itself.

As seen in FIG. 1, a protocol analyzer 102 is disposed in relation to the communications network 100 so as to be able to monitor communications traffic on the communications network 100. It is appreciated, however, that the protocol analyzer can be interconnected with the communications network 100 in any one of a variety of configurations, and thus is not limited to the particular configuration shown in FIG. 1. For example, the protocol analyzer may analyze communications traffic between any two nodes of the network, such as between a server and a computer terminal or a mass storage device. As explained herein, the protocol analyzer 102 may be employed to detect and debug erroneous or aberrant data communications that are included in the communications traffic.

In communication and computer networks, the communication or data transfer occurs through ports that are exposed on the exterior of the protocol analyzer. Protocol analyzers that can be used in connection with the invention typically have multiple ports and can be used to capture and analyze data that is transmitted on different data links in network 100 or in different channels in the network. The need to have ports that can operate in conjunction with other ports has led to the development of chassis that support a certain number of blades, which each supporting a certain number of ports. When these chassis, for example, are mounted on a rack, a large number of ports are available. Accordingly, according to embodiments of the invention such a configuration of chassis may be configured as a protocol analyzer, such as for example network analyzer 102.

Figure 2:
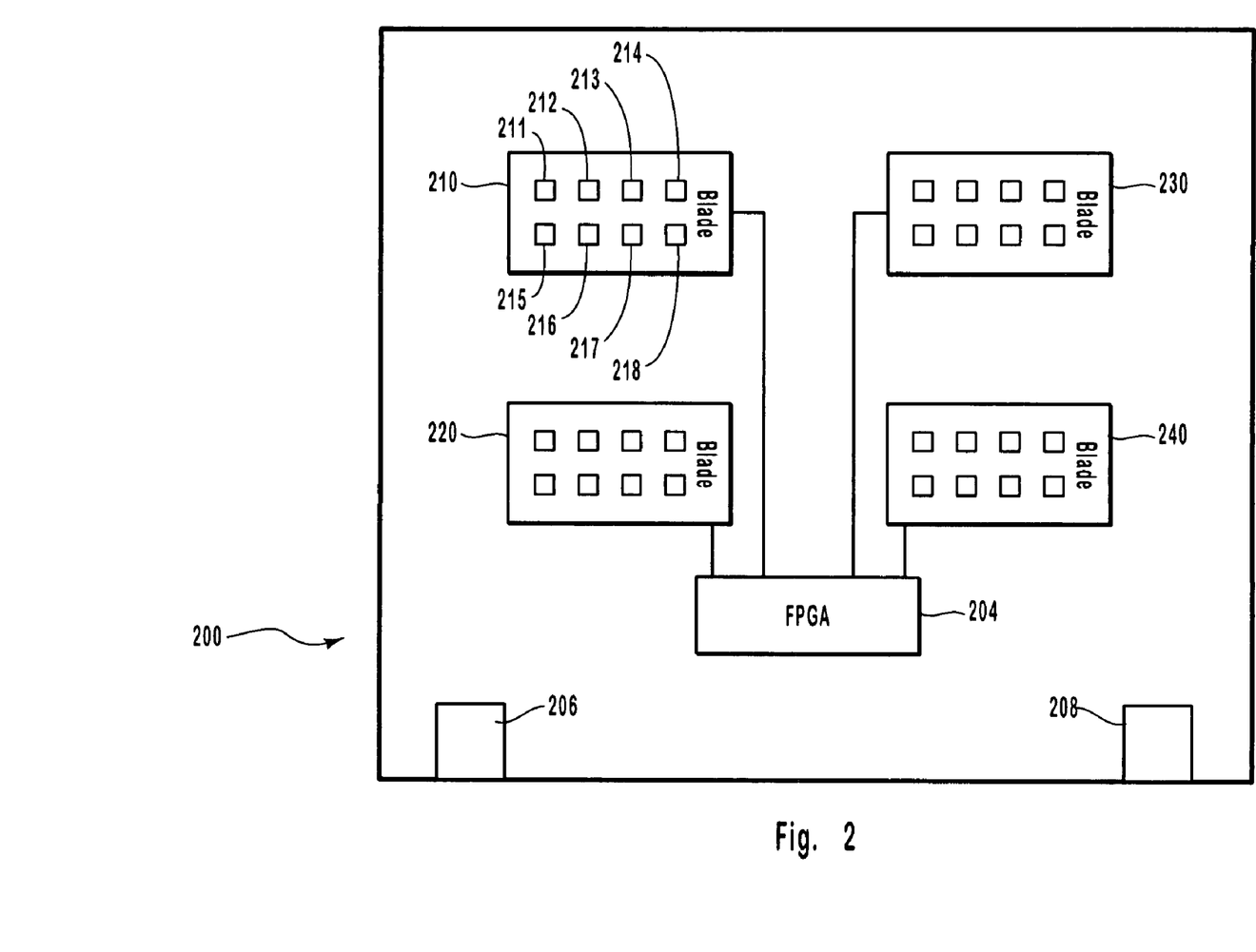
FIG. 2 is a block diagram representing a chassis according to embodiments of the invention.

Referring now to FIG. 2, FIG. 2 is a block diagram that illustrates an exemplary protocol analyzer chassis 200. Generally, a chassis is the physical frame or structure of a computer system or other multi-component device. The protocol analyzer chassis 200 includes four blades, illustrated as blades 210, 220, 230, and 240. A blade is a thin, energy and cost-efficient electronic circuit board that is designed to be plugged or positioned in a chassis with other blades like a book in a library shelf. Such modular electronic circuit boards may contain one, two, or more microprocessors and memory and usually has an operating system and the application program to which it is dedicated. Alternatively, the modular electronic circuit boards may contain logic devices such as application-specific integrated circuits (ASICs) or field programmable gate arrays (FPGAs) that provide, or can be programmed to provide, a desired function, such as a protocol analyzer. According to embodiments of the invention, each blade may include one or more network analyzers thereon, examples of which are provided below. Chassis according to embodiments of the invention may have various numbers of blades, for example, one, two, or four.

Each blade supports a plurality of ports, such as two, four, or eight. The blade 110, for example, includes or supports the ports 211, 212, 213, 214, 215, 216, 217, and 218. The other blades 220, 230, and 240 of chassis 200 similarly include or support a number of ports. The ports physically connect to the transmission medium of the network and can be used to monitor network traffic and capture data of interest. The ports may be either unidirectional or bi-directional ports. Additionally as described in greater detail below, each port is preferably included within a domain, or group of one or more ports that operate collectively.

The chassis 200 further includes, by way of example, a motherboard (not depicted) capable of running software and also capable of communicating with each of the blades. The motherboard has a connection to a network to allow communication with other systems on the network, such as other chassis, and also a client system which is used to configure and control each chassis.

The chassis 200 further includes a field programmable gate array (FPGA) 204 or other similar module. The FPGA 204 is an integrated circuit incorporating an array of programmable logic gates that are not pre-connected but where the connections are programmed electrically by the user. The FPGA 204 can be used, for example, to direct various signals to various ports within the chassis. The FPGA 204 is also used to program each port to a particular domain and to direct the control signals to the appropriate port(s). The FPGA 204 can be programmed via another port from a processor, for example.

The FPGA 204 can also manage the communication between neighboring chassis via the sync cables, also coordinate the transitions between Discovery Mode and Normal Mode as well as coordinate the operation of each.

Referring again to ports 211, 212, 213, 214, 215, 216, 217, and 218, each port is connected with control signals. Exemplary control signals include, but are not limited to, a time stamp clock, run/stop signals, trigger signals to/from the ports on the blades, and trigger signals to/from external hardware. Each port may also be designated for relaying information from various network analyzers on the blade(s). For example, a port may be designated for use with a network traffic generator, such as a network traffic generator having functionality similar to that of the GTX-G Generator, which is a product of Finisar Corporation, of Sunnyvale, Calif. A network traffic generator enables a network administrator or another user to generate data to test both Fibre Channel and Inifiband networks by allowing users to generate and view detailed network responses.

Another network analyzer compatible for use on the blades is an error injection device, such as those that have functionality similar to that of the GTX-J Jammer Module, which is a product of Finisar, Corporation. Error injection allows a user to inject errors into a network in real time and verify that the recovery process operates correctly.

Yet another network analyzer compatible for use in conjunction with the ports is a Bit Error Rate Tester (BERT). A BERT enables verification of data integrity in a local, metro, or wide area network and can test the integrity of both passive and active components in a network. This is accomplished by sending worst-case data patterns through network devices and analyzing the error rate that is introduced by the passive or active components.

The chassis 200 further includes cable receptacles 206, 208, which are each adapted to receive a network cable, or "sync-cable," one in an upstream direction and one in a downstream direction. The cable receptacles, may be, for example, RJ-45 jacks.

Figure 3:
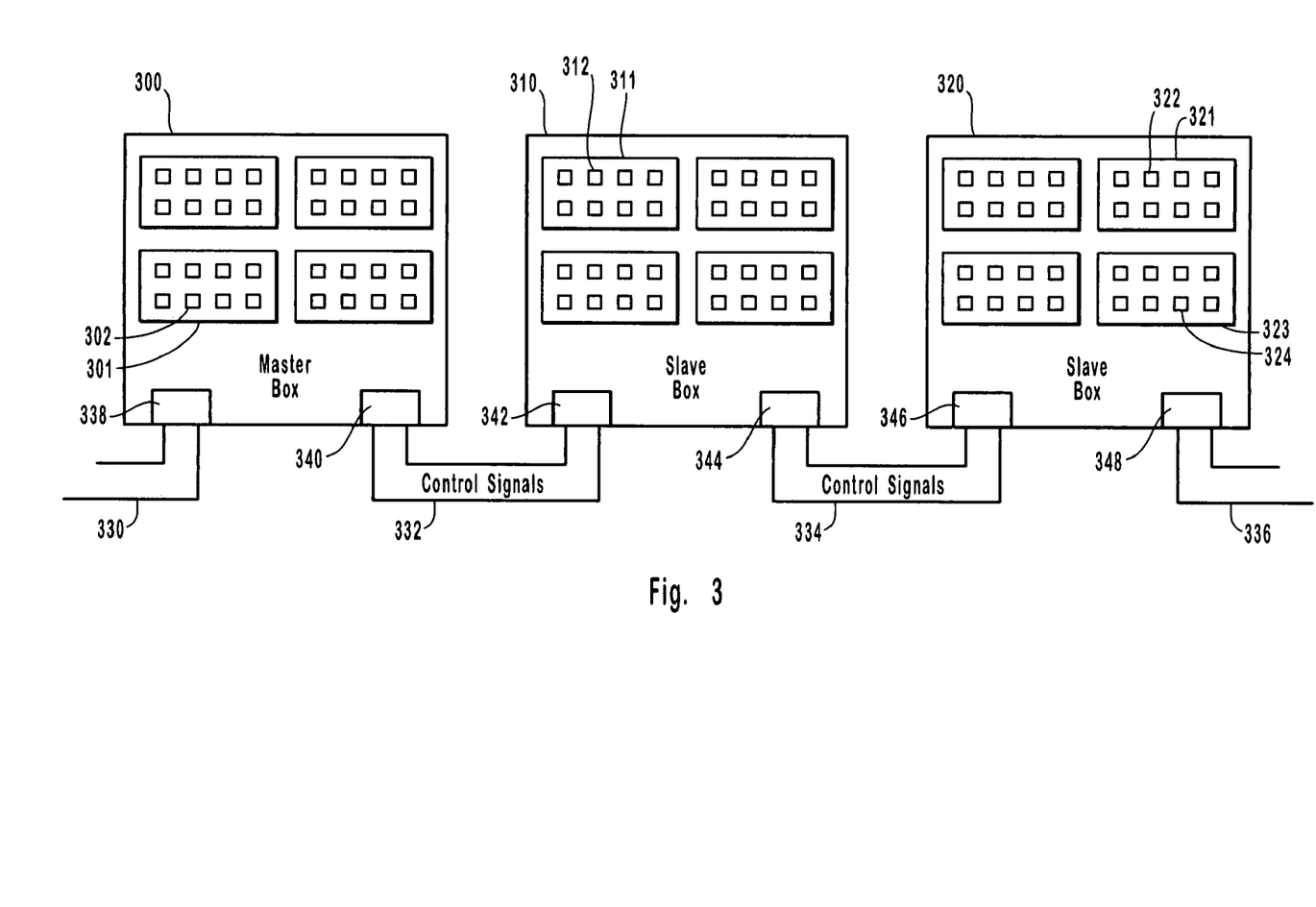
FIG. 3 is a block diagram representing a multi-chassis system according to embodiments of the invention.

Each chassis may be isolated or serially connected to other chassis via the sync-cables. FIG. 3 is a block diagram that illustrates a series of chassis that are connected by sync-cables 330, 332, 334, 336 in a particular topology. In one example, the sync-cables connect to each chassis using RJ-45 connectors which connect with RJ-45 jacks 338, 340, 342, 344, 346, 348 in each chassis. The sync-cables carry the control signals from one chassis to the next. For example, the chassis 300 is connected with the chassis 310 by the cable 332, and the chassis 310 is connected to the chassis 320 by the cable 334. Sync-cables 330 and 336 illustrate that the chassis chain may be extended in either direction. The chassis 300, 310 and 320 are not required to share a common bus or be co-located. Software can be used to detect any illegal connection, such as braches or loops in the chassis topology.

In Discovery Mode, described in greater detail below, each chassis sends data from a chassis identification buffer in both the upstream and downstream directions via the sync-cables. Each chassis, to the extent that it is connected with adjacent chassis, thus also receives data from the upstream and downstream directions and writes this information into two separate buffers. Software can use these four data buffers, two outgoing and two incoming, to determine which chassis, if any, are connected to the upstream and downstream sync-cables. Once the neighboring chassis have been identified, each chassis may communicate with its neighbor(s) via a management port, which is a connection to a network such as a local-area network (LAN). The management port is also the means by which the client software, which is run on a separate system on the network, may communicate with each chassis and/or the chassis that has been designated to be the master of the sync group.

Each group of connected chassis can be regarded as one sync-group. A chassis that is isolated is in a sync-group by itself. During normal operation, the most upstream chassis is designated as a master and has nothing connected to its upstream incoming cable receptacle. All other chassis may be designated to be slaves.

Alternatively, if any chassis besides the most upstream chassis is designated to be a master, the chain is logically broken into multiple chains and no communication takes place between the sub-chains. This is accomplished via a control register in each chassis that specifies whether incoming information is to be ignored from either the upstream or downstream chassis. The most upstream chassis (which should be a master, otherwise it cannot be used), should be configured to ignore any information from its upstream side. Likewise, the most downstream chassis in a chain (which may be a slave or a master) should be configured to ignore any information from its downstream side. Each master chassis, whether it is the most upstream chassis or not, is configured to ignore any information from its upstream side. Any slave chassis that have a master chassis connected to their downstream side (i.e. slaves at the end of each sub-chain) are configured to ignore any information from their downstream side. This guarantees that each sub-chain is isolated from each other, and that any chains that are in normal mode are not interfered with should additional chassis be added to the beginning/end of a chain.

In Normal Mode operation, the sync-cables are used for communication between chassis. Each cable may contain, for example, four signals. The four signals may include a clock signal and a data signal for each direction. In addition, the master chassis generates, for example, a clock signal that will be used by all other chassis for chassis-to-chassis communication, and to generate timestamp clocks for each port.

By way of example, an illustrative chassis can support up to four blades and each blade can support up to eight ports. The illustrative chassis may also support eight domains. A "domain" refers to a group of ports that are logically grouped together by software, such that a single user may control all of the ports in the domain simultaneously, without affecting any of the ports that are not in that domain. Other users may create additional domains, comprised of available ports that have not been previously allocated to a domain. The support for multiple domains allows multiple simultaneous users to share the ports in a chassis. When multiple chassis are connected via sync cables to create a multi-chassis sync group, a domain may be comprised of ports that exist in any of the chassis, not just within the same chassis. Because the chassis or blades are not necessarily of the same technology, it is possible to have different types of ports within a single domain.

Referring again to FIG. 3, depicted is a domain of ports. The domain illustrated in FIG. 3 includes the port 302 from a blade 301 of the chassis 300, a port 312 from a blade 311 of the chassis 310, a port 322 from the blade 321 of the chassis 320, and a port 324 from the blade 323 of the chassis 320. The domain illustrated by FIG. 3 thus comprises ports that are located on different blades of different chassis.

For a given sync group, there is a master chassis, illustrated in FIG. 3 as chassis 300. Methods as disclosed herein can determine which chassis and/or ports are available to the network and connected. A determination is also made as to which chassis is the master chassis and which chassis are slave chassis, illustrated in FIG. 3 as chassis 310, 320.

Figure 4:
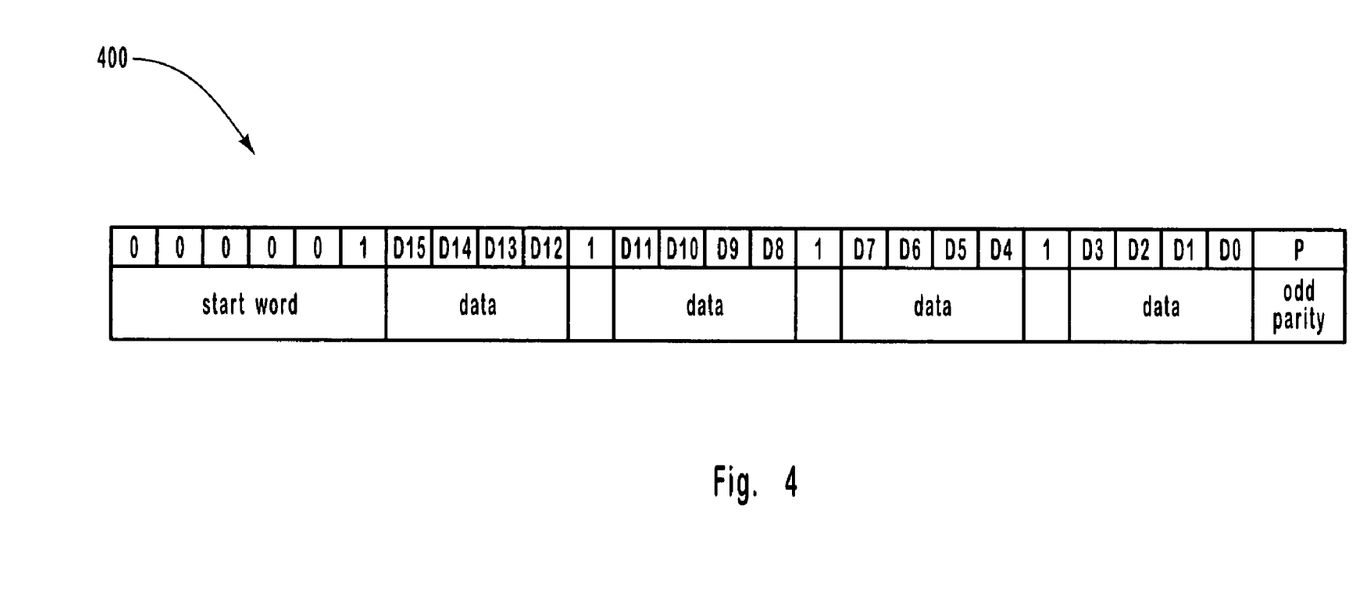
FIG. 4 depicts the protocol used for communicating between chassis according to embodiments of the invention.

Referring now to FIG. 4, depicted is an illustrative data packet or frame 400 of a protocol used for chassis-to-chassis communication according to embodiments of the invention. As defined herein, a "protocol" refers to a defined set of rules or formats that nodes in a telecommunication or computer network use when they communicate. Both nodes must recognize and observe the protocol. As illustrated in FIG. 4, a 26-bit frame 400 is used to provide for synchronization, and the possibility of idle insertion between frames. Sixteen bits of data (D0-D15) are transferred in each frame. In addition, a six bit start word as well as three data delimiters and one parity bit round out the 26-bit frame. This frame has been constructed such that the start word is a unique pattern that will only occur at the beginning of a frame. This allows proper recognition of a frame as it arrives in a serial bitstream and the subsequent extraction of the data bits from the frame. Other frame formats are possible, such as one that inverts each of the bits in the start word and data delimiters, as well uses even parity instead of odd parity.

In the illustrative data packet of FIG. 4, the start word contains five 0's followed by a single 1. Each four-bit nibble is separated by a 1, such that the start word with five consecutive 0's can only occur at the beginning of a frame. A parity bit (representing odd parity) is included to provide some level of error checking. In between frames, i.e. after the parity bit of one frame and the start word of the following frame, 0's may be optionally inserted as idles. Frames transmitted with a data error are ignored.

The data fields have different meanings depending on the mode (Discovery Mode vs. Normal Mode). In Discovery Mode, bits D0-D7 are one data byte, bits D8-D11 are address bits, and bits D12-D15 are reserved. The four address bits represent an offset into a buffer, and the data byte represents the data that should be written into the buffer. During Discovery Mode, a chassis may receive a valid frame from a neighboring chassis, after which it will write the data byte into the buffer at the offset that is specified by the address bits in the frame. Software running in the chassis will interpret all the data in the buffer, and use this information to initiate communication with the neighboring chassis via the management port on the chassis (e.g. via a LAN connection).

In Normal Mode, in contrast, bits D0-D7 represent the trigger information for domains 0-7, respectively, and bits D8-D15 the run/stop information for domains 0-7, respectively. The run/stop and trigger information represents the current state for each of the eight domains. This information will be forwarded to all neighboring chassis, and also to any ports within the chassis that belongs to one of the specified domains. In this way, all of the ports within a particular domain may send and receive run/stop and trigger information to all other ports within the domain, even if the one or more of the other ports are in a separate chassis.

Figure 5:
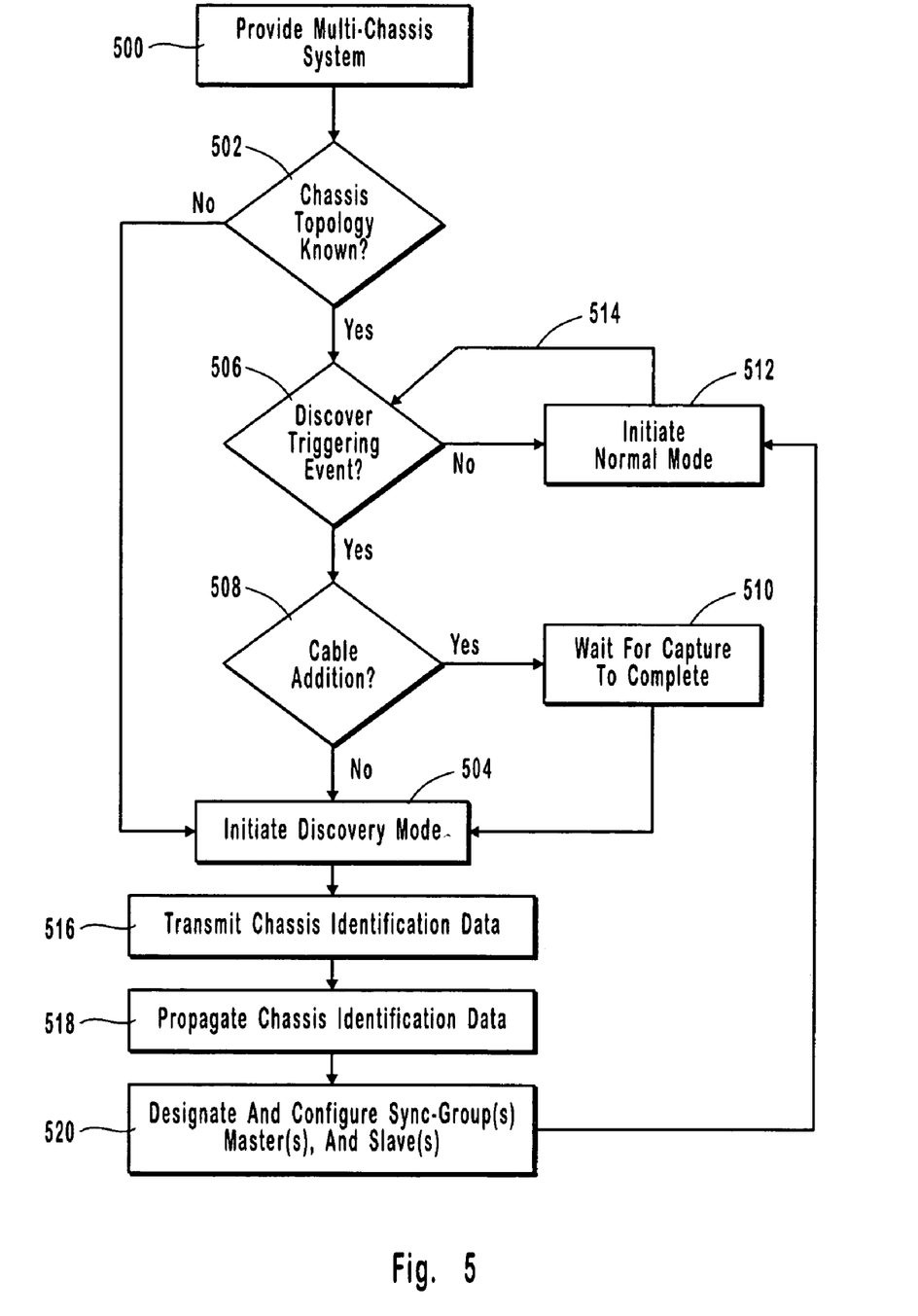
FIG. 5 illustrates the processing details of one embodiment of the operation of the Discovery Mode according to embodiments of the invention.

The flow diagram of FIG. 5 depicts an illustrative method of determining the topology of chassis in a multi-chassis system. As previously mentioned, multi-chassis systems according to the invention have two modes of operation: Discovery Mode and Normal Mode. FIG. 5 illustrates one embodiment of how a multi-chassis system determines its topology, and transitions between Discovery Mode and Normal Mode.

First, as depicted by block 500, a multi-channel system as disclosed herein is provided or assembled. As previously disclosed herein, the multi-channel system may comprise one or more chassis, each chassis having one or more blades, and each blade having one or more ports. Sync-cables interconnect the chassis, and incoming and outgoing buffers are in communication with each cable receptacle on each chassis.

According to various embodiments of the invention, some or all of the remaining steps in the method may be performed by an FPGA, such as FPGA 204 in FIG. 2. Accordingly, software in the chassis and an FPGA or other device (for simplicity hereinafter, collectively "FPGA") first tests whether the chassis topology is known, as depicted by decision block 502. If the topology is not known, the Discovery Mode of the protocol analyzer is initiated, as indicated by block 504.

If however, the chassis topology is known, the software and FPGA next tests whether a discovery triggering event has occurred, as depicted by decision block 506. Of course, the relative position of decision block 506 is for illustrative purposes only. A Discovery Mode triggering event can occur at any time relative to the methods of the invention and trigger the start of the Discovery Mode. Such Discovery Mode triggering events may include for example, power up, sync cable attachment, sync cable removal, and specific instructions to commence the discovery mode. Accordingly, if a Discovery Mode triggering event occurs, Discovery Mode is initiated, as illustrated by block 504.

For example, if the network analyzer is running a capture of network data and a sync cable is removed, then the capture is no longer valid. At that point, the Discovery Mode is commenced to identify the current topology of the remaining interconnected chassis. Similarly, the addition of a cable during a data capture requires the reactivation of the Discovery Mode. In contrast to cable removal, however, the capture is not invalidated and therefore does not need to be terminated. Initiation of the discovery mode can therefore wait until after the capture is completed. Accordingly, before Discovery Mode is initiated, as indicated by block 504, decision block 508 tests whether the Discovery Mode triggering event is the addition of a cable. If so, the data capture is allowed to complete, as indicated by decision block 510, before the Discovery Mode is initiated.

If, however, no Discovery Mode triggering event is detected, Normal Mode is initiated, or continued, as depicted by block 512. Arrow 514 illustrates that Normal Mode may optionally maintain contact with decision block 506 so as to know when Discovery Mode should again be initiated. In addition to details of the operation of the Normal Mode described herein, further details are provided in U.S. Provisional Patent Application Nos. 60/484,208 and 60/483,993, both previously incorporated herein by reference, as well as is otherwise known or will be developed in the art.

After Discovery Mode is initiated, identification data for each chassis is transmitted from buffers in each chassis through sync-cables and to adjacent upstream and/or downstream chassis, if present, as depicted by block 516. Once the identification data has been received, the chassis may communicate to the neighboring chassis via its management port, which is a connection to a network such as a LAN. Each chassis propagates the chassis identification data it receives, as depicted by block 518, so that at least one chassis obtains the identification data of each chassis and can thereby determine the topology of the entire chain of chassis.

Once it is determined which protocol analyzer chassis are in the chain, the chain is optionally split into multiple sub-chains resulting in multiple sync-groups, as depicted by block 520. As further depicted by block 520, in each sync-group the most upstream chassis is designated as the master and the remaining chassis are designated as slaves. If the topology of the sync group is such that a closed loop exists, where there are no endpoints in the chain, an alternate method for designating the master chassis may be used. An example of one such method would be to select the chassis with the highest internet protocol (IP) address to be the master chassis.

Now that the topology of the chassis is determined Normal Mode is initiated, as depicted by block 512. According to the Normal Mode operation of embodiments of the invention, the ports in the multi-chassis sync group can be configured into one or more domains, each of which operates synchronously, and also independently of the other domains. Generally, in Normal Mode operation, each chassis in a chain sends run/stop and trigger information via the sync-cables. The run/stop/trigger information is on a domain-by-domain basis, not port-by-port as may be the case with intra-chassis run/stop/trigger signals. Each chassis can be programmed to send run/stop and trigger information in either the upstream or downstream directions, or both. Each chassis has control registers that can inhibit the transmission or reception of run/stop/trigger information to/from either the upstream or downstream direction. This level of control allows chassis to be added to the chain without disrupting chassis that are already running. It also allows a single chain to be broken into smaller sub-chains with multiple master chassis.

In Normal Mode, ports perform two basic operations, both of which are defined by software that configures the ports in the blades to monitor and capture the data as desired by the user. First, the ports filter data packets associated with the network traffic that is being monitored to capture only those packets that are of interest, such as only packets between two specified nodes in the network. This is performed after the master chassis sends a Run signal to all the ports within the domain. The filtering is performed and the data that has been appropriately filtered is captured in capture buffers associated with the ports, while the rest of the data is discarded.

The other operation is triggering, which is performed when a certain bit pattern in the filtered packets is identified. Any chassis that detects a trigger condition sends a trigger signal to the other ports in the domain to cause them also to trigger. The triggering typically results in a trigger flag being placed in the capture buffer. Additionally, the triggering can be used to end the capture process, either immediately, or after a specified percentage of the capture buffer has been filled. Alternately, the detection of a trigger condition may be used to trigger an external piece of test equipment via connectors on the chassis.

Once the trigger has occurred and the data has been captured, the user can look at all of the traces derived from the captured data on one screen and see the data captured from all ports at once, all of which were triggered at substantially the same moment. The user can then look at what was happening on other ports when the trigger occurred.

In order to enable the data from multiple ports distributed over multiple chassis to be used together to analyze network traffic, the capture and triggering of the monitored network traffic needs to be synchronized between the multiple chassis. However, there is latency in propagating signals between the multiple chassis in the chain which, in the absence of the invention, can introduce errors on the order of microseconds or more.

Accordingly, according to embodiments of the invention that are more fully described in the previously incorporated by reference provisional patent applications, chassis in the chain have programmable delays to compensate for the time required to propagate signals through the chain. Through experiment and/or calculation, it can be determined how long it takes to propagate a signal to the next chassis. The latency is predictable and can be defined in cycles or nanoseconds. Each chassis has a delay register that applies an event, such as a run signal or a trigger signal, to the ports in the chassis only after the expiration of a delay value. The master chassis has the largest delay, since all downstream chassis need to receive the signal before the chassis can begin to operate with a common counter. The first slave has a relatively large delay, with successive slaves having smaller delays. This process can coordinate the operation of the chassis within a few or tens of nanoseconds instead of microseconds or more.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a system including one or more chassis in a multi-chassis system in a computer network, a method performed by a computing system including a hardware processor and memory for determining the topology of the chassis and defining a domain within the system, comprising:
    providing at least one chassis, each chassis comprising:
        at least one blade having at least one port connected to a network and capable of monitoring network traffic and capturing data of interest;
        at least one of
            a first incoming buffer and a first outgoing buffer in communication with an upstream cable receptacle; and
            a second incoming buffer and a second outgoing buffer in communication with a downstream cable receptacle;
    in response to a selected event, initiating a discovery process comprising transmitting data sufficient to identify each chassis from at least one of the first outgoing buffer and the second outgoing buffer of each chassis to an adjacent chassis; and
    defining a domain within the system, wherein the domain is a logically grouped set of ports which exist within more than one chassis of the system such that a single user controls all of the ports within the domain simultaneously.

2. A method as defined in claim 1, further comprising propagating the data sufficient to identify each chassis throughout the multi-chassis system such that at least one chassis can identify each chassis in the system.

3. A method as defined in claim 1, wherein the at least one chassis further comprises a management port for communication with a second network, whereby the second network provides a link for communication between multiple chassis as well as communication between a client system and the at least one chassis.

4. A method as defined in claim 1, wherein the selected event is selected from the group consisting of: power-up, cable removal, cable attachment, and receipt or activation of instructions to determine the topology of the multi-chassis system.

5. A method as defined in claim 1, wherein the system comprises a first chassis and a second chassis, each of the first and second chassis comprising first and second cable jacks, the first chassis being connected to the second chassis via a cable connected to the first cable jack of the first chassis and the second cable jack of the second chassis.

6. A method as defined in claim 5, wherein the identification data of the first chassis transmitted from the first outgoing buffer is received by a second incoming buffer of the second chassis.

7. A method as defined in claim 5, wherein the first and second cable jacks comprise RJ-45 jacks.

8. A method as defined in claim 1, wherein the data sufficient to identify each chassis comprises the IP address of each chassis.

9. A method as defined in claim 1, wherein the data sufficient to identify each chassis is used for initiating communication between the chassis via a connection to a network.

10. A method as defined in claim 1, further comprising the step of configuring at least one port into a domain.

11. A method as defined in claim 10, wherein the domain comprises a first port located on a blade on a first chassis and a second port located on a blade on a second chassis.

12. A method as defined in claim 1, wherein providing at least one chassis comprises providing at least two chassis and further comprises the step of dividing the at least two chassis into a plurality of sync-groups, each sync-group comprising at least one master chassis for coordinating the normal mode operation of its sync-group.

13. A method as defined in claim 1, wherein at least one of the blades on the at least one chassis comprises a network analyzer selected from the group consisting of: a bit error rate tester and an error injection device.

14. A network analyzer chassis, comprising:
    at least one blade, the blade comprising at least one network analyzer and further comprising at least one port thereon for communicating with a computer network, the at least one port being part of a domain along with at least one additional port located within a different chassis, the domain being a logical group of ports such that a single user controls all of the ports within the domain simultaneously;
    an upstream cable receptacle for optionally connecting to an upstream adjacent chassis via a first cable;
    a downstream cable receptacle for optionally connecting to an downstream adjacent chassis via a second cable;
    an incoming buffer connected to either the upstream cable receptacle or the downstream cable receptacle and configured for receiving chassis identification data from an adjacent chassis; and
    an outgoing buffer comprising chassis identification data and connected to either the upstream cable receptacle or the downstream cable receptacle and configured for transmitting the chassis identification data through the cable receptacle to an adjacent chassis.

15. A chassis as defined in claim 14, wherein the chassis identification data comprises the IP address of the network analyzer chassis as well as the IP address and relative location of one or more other chassis in a multi-chassis system.

16. A chassis as defined in claim 14, further comprises a management port for communication with a second network, whereby the second network provides a link for communication between the chassis and at least a second chassis as well as communication between a client system and the chassis.

17. A chassis as defined in claim 14, further comprising additional chassis, wherein the chassis identification data can be propagated between each of the chassis such that at least one chassis can identify the topology of each chassis.

18. A chassis as defined in claim 14, wherein the chassis identification data is transmitted in response to a selected event selected from the group consisting of power up, cable removal, cable attachment, and receipt or activation of instructions to determine the topology of a multi-chassis system.

19. A chassis as defined in claim 14, wherein the upstream and downstream cable receptacles comprise RJ-45 jacks.

20. A chassis as defined in claim 14, wherein the at least one port is configured into a domain.

21. A chassis as defined in claim 20, wherein the domain further comprises at least one port selected from a second chassis that is serially connected to the network analyzer chassis such that the ports can operate collectively.

22. A chassis as defined in claim 14, wherein at least one of the blades comprises a network analyzer selected from the group consisting of: a bit error rate tester and an error injection device.

23. In a high speed communications system configured to operate in conjunction with a network data stream, a method performed by a computing system including a hardware processor and memory for determining the topology in a multi-chassis system, comprising:

in response to a selected event in a multi-chassis system, transmitting data sufficient to identify each of multiple chassis in the multi-chassis system from at least one of the first outgoing buffer and the second outgoing buffer of each chassis to an adjacent chassis;

propagating the data between the multiple chassis in the multi-chassis system sufficient that at least one chassis in the multi-chassis system can identify the topology of each chassis;

verifying that the multiple chassis in the multi-chassis system are connected in a serial chain;

designating a particular chassis in the chain as a master chassis; and the master chassis coordinating the interaction of each chassis.

24. A method as defined in claim 23, wherein the selected event is selected from the group consisting of: power-up, cable removal, cable attachment, and receipt or activation of instructions to determine the topology of the multi-chassis system.

25. A method as defined in claim 23, wherein the data sufficient to identify each chassis comprises the IP address of each chassis.

26. A method as defined in claim 23, wherein the data sufficient to identify each chassis is used for initiating communication between the chassis via a connection to a network.

27. A method as defined in claim 23, further comprising configuring at least one port on at least one blade on at least one of the chassis into a domain.

28. A method as defined in claim 23, further comprising dividing the multi-chassis system into a plurality of sync-groups, each sync-group comprising at least one master chassis for coordinating the normal mode operation of its sync-group.

* * * * *